United States Patent [19]

Jones

[11] Patent Number: 4,811,181

[45] Date of Patent: Mar. 7, 1989

[54] LIGHT FIXTURE BI-DIRECTIONAL JOINT AND MOUNTING MEANS

[75] Inventor: Robert D. Jones, Oskaloosa, Iowa

[73] Assignee: Mycro Group Company, Oskaloosa, Iowa

[21] Appl. No.: 178,535

[22] Filed: Apr. 7, 1988

[51] Int. Cl.[4] .......................... F21M 3/18; B60Q 1/06

[52] U.S. Cl. .................................... 362/287; 362/250; 362/419; 362/428; 362/431

[58] Field of Search ................. 362/61, 233, 250, 285, 362/287, 418, 419, 427, 428, 430, 431

[56] References Cited

U.S. PATENT DOCUMENTS

| | | | |
|---|---|---|---|
| 2,230,900 | 2/1941 | Neitzke | 362/419 |
| 4,190,881 | 2/1980 | Drost et al. | 362/250 |
| 4,220,981 | 9/1980 | Koether | 362/61 |
| 4,410,933 | 10/1983 | Blake et al. | 362/287 |
| 4,423,471 | 12/1983 | Gordin et al. | 362/96 |
| 4,450,507 | 5/1984 | Gordin | 362/61 |
| 4,712,167 | 12/1987 | Gordin et al. | 362/233 |
| 4,729,077 | 3/1988 | Gordin et al. | 362/285 |

FOREIGN PATENT DOCUMENTS 1114798 12/1981 Canada .

*Primary Examiner*—Ira S. Lazarus
*Assistant Examiner*—Richard R. Cole
*Attorney, Agent, or Firm*—Zarley, McKee, Thomte, Voorhees & Sease

[57] ABSTRACT

A bi-directional joint and mounting means for allowing tiltable and pivotal movement of a lighting fixture on opposite sides of a mounting structure. A base member is pivotally securable to the mounting structure around a first axis. A joint member is rigidly secured and extends from the base member and includes a hinge which allows the joint member to pivot with respect to a second axis which is generally perpendicular to the first axis. The first and second brackets are associated with the light fixture and the base member, respectively, and allow adjustable attachment of an adjustment member or actuator member to different locations depending which side of the mounting structure the lighting fixture is desired to be positioned, and adjusted. The third bracket members can also be utilized with respect to the base member and a second adjustment member or actuator member to allow pivoting of the light fixture around the first axis, depending on which side of the mounting structure the lighting fixture is desired to be positioned.

16 Claims, 1 Drawing Sheet

LIGHT FIXTURE BI-DIRECTIONAL JOINT AND MOUNTING MEANS

BACKGROUND OF THE INVENTION a. Field of the Invention

The present invention relates to a joint and mounting means for lighting fixtures, and in particular, relates to a joint and mounting means whereby the fixture is adjustable in a variety of directions and can be positioned on either side of a mounting structure.

b. Problems in the Art

There are many different known ways to mount a lighting fixture to a mounting structure. Generally, the apparatus to accomplish this mounting is rigid and non-adjustable, as it is intended to support and hold the lighting fixture in a desired aiming direction.

There are, however, situations where it is desired to be able to adjust the aiming direction of the lighting fixture after it has been mounted to the mounting structure. Some small lighting fixtures, such as those used in desk or office lamps, are able to be adjusted in orientation easily because of their small size and weight. However, the ability for adjustable mounting of large lighting fixtures, such as those used in wide scale lighting applications, is problematic.

The relatively large size and weight of wide scale lighting fixtures commands that the mounting structure be able to support the weight, and maintain that support for unlimited years of service. Additionally, safety considerations come into significant play. Because many times these lights are in environments which cannot be easily controlled, such as outside, or placed high up on supporting structures, the ability to have adequate support and at the same time allow adjustability of these fixtures, is difficult to accomplish.

Most times, wide scale lighting, such as is used for lighting sporting fields or for other large area lighting purposes requires the lights to be supported well above the target location. The mounting structure used for such lighting fixtures is generally some sort of a cross-bar or the like attached to a strong vertical post or boom. Therefore, another problem involved in developing an adequately adjustable mounting means for these lighting fixtures is that the lighting fixtures are not easily accessible. In other words, not only is it impractical and dangerous to expect to manually adjust the orientation of such lights on any regular basis, the mounting structure (usually a cross-bar) prohibits easy mounting or adjustment of the lighting fixtures in many directions.

Because wide scale lighting fixtures generally are oriented downwardly towards a target area, the need is to have both structural support and adjustability, in downward tilted directions. The present inventor has previously developed a mounting means and joint which allows such adjustability and support, but that particular adjustability and support is possible in a downward tilted direction on one side of the mounting structure only. By referring to commonly owned U.S. Pat. Nos. 4,729,077 and 4,712,167, both by Gordin and Drost, and hereby incorporated by reference, it can be seen that the present inventor had developed a mounting means and joint which allows tilting and panning of a lighting fixture from a mounting structure. U.S. Pat. No. 4,729,077 and 4,712,167 disclose the remote adjustability of a lighting fixture, but again are limited only to panning and tilting on one side of the bar to which it is mounted.

A real need exists for a mounting structure and adjustability joint which will permit mounting and adjustability of such light fixtures on both sides of the bar. It is therefore a primary object of the present invention to improve over or solve the deficiencies and problems in the art.

Another object of the present invention is to present a bi-directional joint and mounting means for lighting fixtures which presents sufficient strength and structural rigidity to support a lighting fixture from a mounting structure, and yet permits tilting and pivoting adjustability.

A further object of the present invention is to provide a means as above described which allows such bi-directional adjustability, that is, from opposite sides of a mounting structure.

A further object of the present invention is to provide a means as above described, which can allow remote adjustability of the lighting fixture.

Another object of the present invention is to provide a means as above described, which is economical, efficient, and durable.

These and other objects, features and advantages of the present invention will become more apparent with reference to the accompanying specification and claims.

SUMMARY OF THE INVENTION

The present invention includes a bi-directional joint and mounting means for lighting fixtures which is bi-directional in the sense that it allows tilting and pivoting movement of a lighting fixture from opposite sides of the mounting structure.

A base member is pivotable about a first axis (usually vertical) and securable to the mounting structure. A joint member extends from the base member and is hingeable about a second axis (usually horizontal) generally perpendicular to the first axis.

Bracket means is associated with the outer end of the joint member and the light fixture and is adapted to receive one end of an adjustment member or actuator member. The other end of the adjustment member actuator member is attachable to a second bracket means on the base member. By selecting the attachment points between the first and second brackets, the light fixture can be oriented on a desired side of the mounting structure and can be adjustable to a generally vertical tilting or pivoting orientation desired from that side. By detaching the adjustment or activator members, moving the light fixture to the opposite side of the mounting structure, and reattaching the adjustment or actuator members, tilting movement on the other side of the mounting stucture can be accomplished.

Additionally, a third bracket means can extend from the base member and be adapted to attach to one end of a second actuator or adjustment member which in turn attaches at its other end to the mounting structure. By selective attachment between the mounting structure and the third bracket means, the base member (and thus the light fixture) can be generally horizontally pivoted about the first or panning axis (generally perpendicular to the second or tilting axis of the joint member) to allow pivoting or panning adjustability on either side of the mounting structure.

The invention therefore presents a mounting structure which is sufficient to support lighting fixtures, even those of large size and weight, and at the same time allow adjustability on either side of the mounting structure. The invention accomplishes this in an efficient but structurally secure manner.

It can therefore be seen the invention achieves at least all of its stated objectives.

DETAILED DESCRIPTION OF THE PREFERRED EMBODIMENT

With reference to the drawings, a preferred embodiment of the present invention will now be described. Like numerals will refer to like parts in all of the figures.

Figure 1:
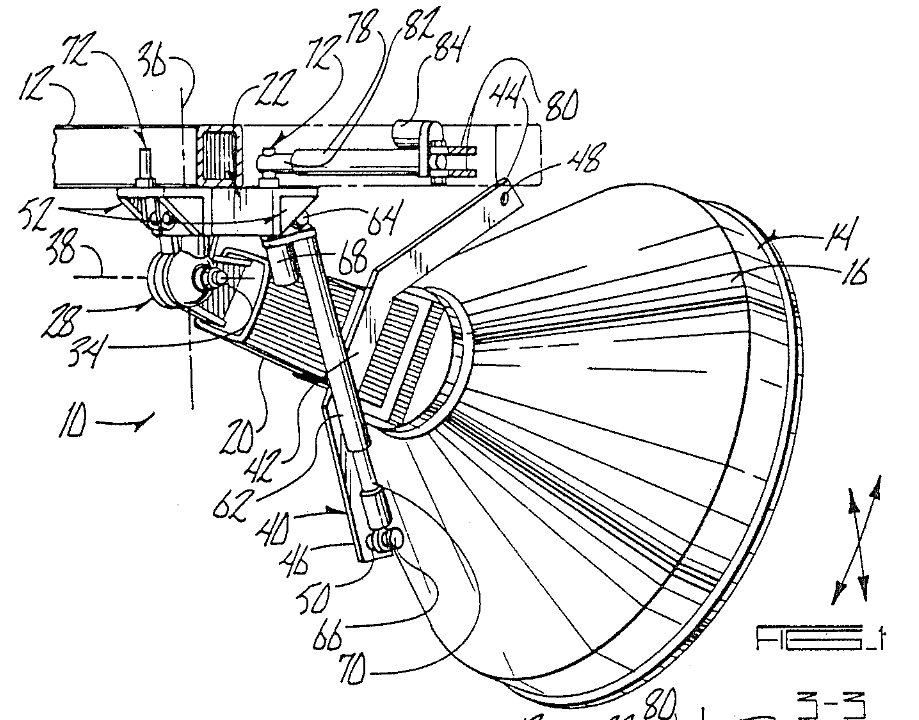
FIG. 1 is a perspective view of the preferred embodiment of the invention.

FIG. 1 shows in perspective form a preferred embodiment of the invention 10 as attached to cross-bar 12, and lighting fixture 14. Cross-bar 12 comprises what generally can be called the mounting structure. (Cross-bar 12 is in turn generally attached to a vertical support such as a pole or boom). Lighting fixture 14 is comprised of a reflector 16, lens 18, and socket member 20. A lamp (not shown) is removably mounted within socket member 20, and is positioned within the interior of reflector 16.

Figure 3:
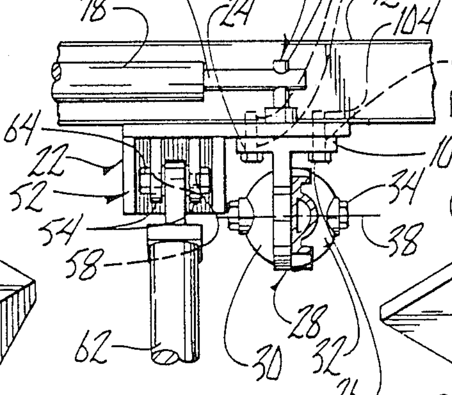
FIG. 3 is a sectional view taken along lines 3—3 of FIG. 2.
Figure 4:
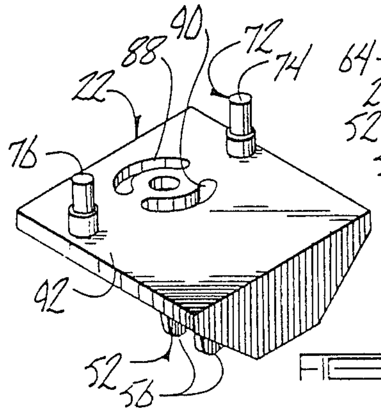
FIG. 4 is an isolated perspective view of the top of the base member of the embodiment shown in FIG. 1.
Figure 5:
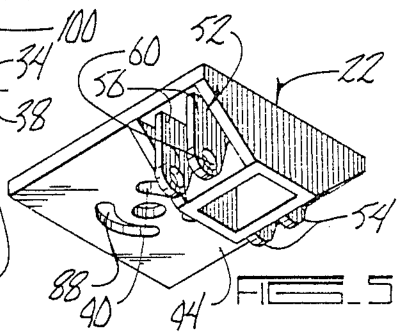
FIG. 5 is a perspective view of the bottom of the base member of the embodiment shown in FIG. 1.

A base member 22 is pivotally mounted to the underside of cross-bar 12 by bolts 24 and 26 (see FIGS. 3-5). This arrangement allows horizontal pivoting or panning movement. A joint member 28 consists of a first section 30 rigidly attached to base member 22 and a second section 32 attached at its outer end to socket member 20 of lighting fixture 14. The adjacent ends of first and second sections 30 and 32, with bolt 34, form a joint to allow the vertical pivoting or tilting of lighting fixture 14.

For further reference, the panning pivoting of base member 22 with respect to the underside of cross-bar 12 is around a generally vertical first axis (shown in broken line labeled by reference numeral 36). In contrast, bolt 34 of joint member 28 defines basically a horizontal second axis (referred to by reference numeral 38). First and second axes 36 and 38 are generally perpendicular to one another. Thus, by selective panning and tilting of base member 22 and joint member 28, respectively, lighting fixture 14 can take on a variety of aiming orientations on the one side of cross-bar 12,as depicted in FIG. 1.

FIG. 1 additionally depicts first bracket 40 which in the preferred embodiment is secured to socket member 20 of lighting fixture 14. Alternatively, it could be attached to second section 32 of joint member 28. First bracket 40 comprises a middle portion 42 and opposite end portions 44 and 46 which extend basically outwardly from middle portion 42 and away from joint member 28. At the outer end of each of end portions 44 and 46 is an aperture 48 and 50, respectively.

A second bracket 52 is integrally formed into base member 22 and in the preferred embodiment of FIG. 1 actually comprises first and second sets of flanges 54 and 56. It is particularly pointed out that sets 54 and 56 are generally positioned on opposite sides of cross-bar 12 and each flange of each set includes an aperture 58 or 60, respectively.

It can be seen in FIG. 1, that a piston actuator 62 is hingeably attached at its opposite ends by pins 64 and 66 to aperture 50 of first bracket 40 and apertures 58 of first set of flanges 54 of second bracket 52. By operation of actuator motor 68, extension or retraction of arm 70 of piston actuator 62 will cause tilting movement of lighting fixture 14 about second axis 38 of joint member 28. It is to be understood that although this arrangement allows vertical tilting movement of less than 90°, it is sufficient to achieve a number of tilting aiming positions on that side of cross-bar 12. As can be easily understood, when wide scale lighting fixtures are positioned at substantial heights above the ground, only small changes in vertical tilting direction correspond to large changes in light pattern position on the ground.

FIG. 1 also shows that what is referred to as third bracket 72 can also be positioned on base member 22. Third bracket 72 actually consists of first and second posts 74 and 76 extending upwardly from the top of base member 22 basically above first and second sets 54 and 56 of second bracket 52. In FIG. 1, cross-bar 12 has been partially shown in ghost lines to depict the relationship of first and second posts 74 and 76. Posts 74 and 76 are basically on opposite sides of cross-bar 12. A piston actuator 78 can extend between first post 74 and a set of flanges 80 attached to the far side of cross-bar 12, as depicted in FIG. 1. Because base member 22 is pivotable around first axis 36, extension or retention of piston arm 82 by actuator motor 84 causes horizontal pivoting or panning of light fixture 14. Panning movement would be limited to the extent to which base member 22 can be pivoted around first axis 36, but in the preferred embodiment is sufficient to allow a substantial amount of generaly horizontal panning movement. The configuration of FIG. 1 would thus allow panning and tilting adjustability of lighting fixture 14 with respect to one of the sides of cross-bar 12. It is to be understood that in the preferred embodiment, panning pivoting of base member 22 is also less than 90°. Therefore the panning and tilting movement of lighting fixture 14 is confined basically to the lower right hand quadrant of FIG. 1 as defined by first and second axes 36 and 38.

Figure 2:
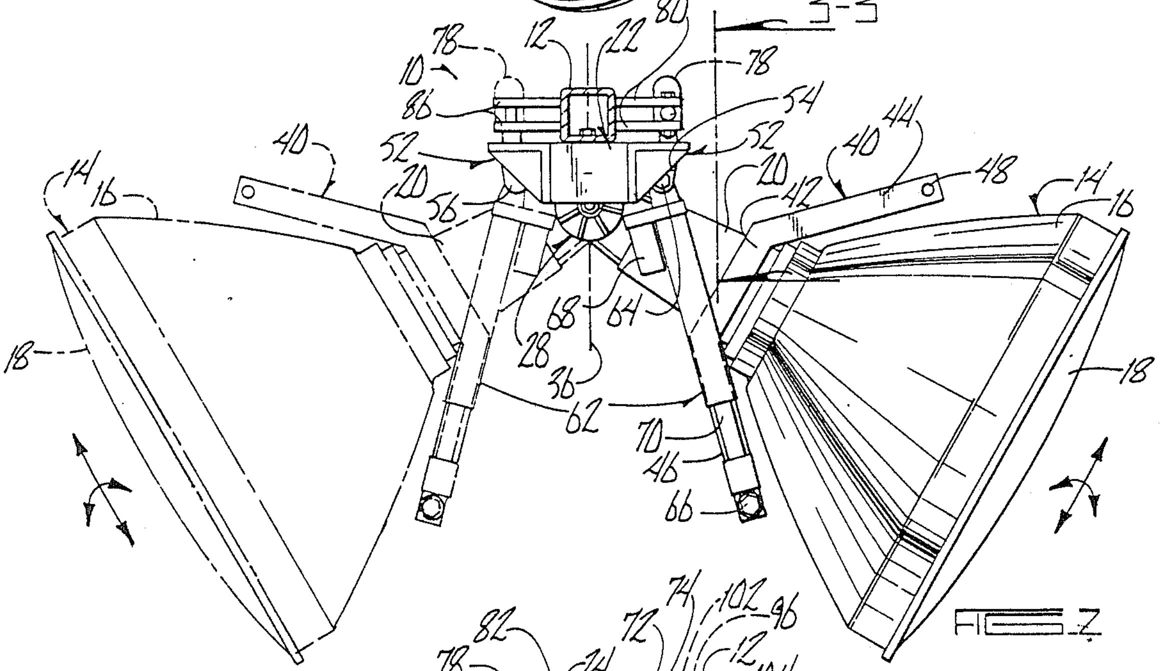
FIG. 2 is a side elevational view of the embodiment of FIG. 1, and includes in ghost lines the lighting fixture adjusted to an opposite side of the mounting structure.

FIG. 2 depicts, however, that invention 10 allows the same sort of panning and tilting adjustability for the opposite side of cross-bar 12. Because first, second, and third brackets 40, 52, and 72 each have two attachment points which basically correspond to opposite sides of cross-bar 12, by removing actuators 62 and 78 from their positions in FIG. 1, and instead mounting them in the positions shown in ghost lines in FIG. 2 (see reference numerals 62' and 78') panning and tilting on the opposite side of cross-bar 12 (or the lower left hand quadrant as defined by axes 36 and 38) can be accomplished.

FIG. 2 explicitly depicts the second set of flanges 86 of third bracket 72 (not shown in FIG. 1), which allows piston actuator 78 to be hingeably secured to the opposite side of cross-bar 12 from first set of flanges 80 of third bracket 72.

FIGS. 3-5 depict in more detail the pivotal attachment of actuator 62 to either first or second sets 54 and 56 of flanges of second bracket 52, the pivotal and easily releasable attachment of arm 82 of actuator 78 with respect to either of posts 74 and 76 of third bracket 72, and also the configuration of the hinge portion of joint member 28.

FIGS. 3–5 also depict the pivotability of base member 22 upon cross bar 12. In the preferred embodiment, two curved slots 88 and 90 are positioned through base member 22 between its top surface 92 and bottom surface 94. Slots 88 and 90 are arcuate but are oppositely disposed towards one another so as to approximate arcs along the circumference of the same circle. As can be seen in FIG. 3, bolts 24 and 26 extend through apertures 96 and 98 in plate 100 of first section 30 of joint member 28. Bolts 24 and 26 then extend respectively through slots 88 and 90 into tapped apertures (not shown) in the bottom of cross-bar 12. Plate 100 can be welded to base member 22. Bolts 24 and 26 are tightened sufficiently to bring base member 22 into frictional abutment with the bottom of bar 12, yet still allow pivotal movement of base member 22. As posts 74 and 76 of third bracket 72 are rigidly secured to the top of base member 22, when actuator 78 pulls or pushes either post 74 or 76, it causes base member 22 to pivot around bolts 24 and 26. The extent to which base member 22 can be pivoted is limited by the length of curved slots 88 and 90.

It will be appreciated that the present invention can take many forms and embodiments. The true essence and spirit of this invention are defined in the appended claims, and it is not intended that the embodiment of the invention presented herein should limit the scope thereof.

For example, instead of actuators 62 and 78, the invention 10 could utilize adjustment members which would extend between the first and second brackets 40 and 52 to merely hold the lighting fixture in a certain tilting orientation, and in a certain pivoted orientation. By selecting different length adjustment members (or by manually extending or retracting the adjustment members to a desired length), different orientations could be achieved, depending on which side of the cross-bar 12 the lighting fixture 14 was positioned.

It is to be understood that to switch lighting fixture 14 from one side of cross-bar 12 to the other only requires removal of actuators 62 and 78, loosening of bolt 34, and manually pivoting lighting fixture 14 to the opposite side of cross-bar 12. Bolt 34 can then be tightened so as to bring adjoining first and second sections 30 and 32 of joint member 28 into frictional abutment, but remain loose enough to allow pivoting around axis 38. Actuators 62 and 78 (or adjustment members) could then be reconnected to appropriate brackets to achieve the desired orientation of lighting fixture 14.

It is to be further understood that each of the first, second and third brackets could have multiple attachment points to allow different initial orientations of lighting fixture 14, or otherwise different sized actuators or adjustment members.

It is also to be understood that, alternatively, the different attachment points for first, second and third brackets could be substituted by movable brackets which could be moved to different locations depending on which side of cross-bar 12 lighting fixture 14 is desired.

Other methods for pivoting around first and second axes 36 and 38 are also possible. It is also to be understood that invention 10 could be applied to mounting structures other than cross-bar 12.

What is claimed is:

1. A bi-directional joint and mounting means for hingeable and adjustable movement of a lighting fixture on opposite sides of a mounting structure, comprising:

a base member mountable to the mounting structure and being pivotable about a first axis;

a joint member having a first section rigidly secured to the base member, and a second section hingeably secured to the first section, and being pivotable about a second axis which is generally perpendicular to the first axis about which the base member pivots, the light fixture being mountable to the second section of the joint member;

a first bracket means associated with the second section of the joint member and the light fixture having attachment means for allowing attachment to an end of a first actuator means;

a second bracket means associated with the base member in the first section of the joint member having attachment means for allowing attachment to an opposite end of the first actuator means;

the first actuator means being mountable in a first position with respect to the first and second bracket means to allow pivotable movement of the lighting fixture about the second axis on one opposite side of the mounting structure, and being mountable in a second position with respect to the first and second bracket means to allow pivotable movement of the lighting fixture about the second axis on the other opposite side of the mounting structure.

2. The means of claim 1 further comprising a third bracket means associated with the base member having attachment means for allowing attachment to an end of a second actuator means, the second actuator means being mountable between the second bracket means attachment means in a first position with respect to the base member to allow pivotal movement of the lighting fixture about the first axis on one opposite side of the mounting structure, and being mountable in a second position with respect to the base member to allow pivotal movement of the lighting fixture about the first axis on the other opposite side of the mounting structure.

3. The means of claim 1 wherein the mounting structure comprises a generally horizontally positioned bar.

4. The means of claim 3 wherein the base member is mountable generally to the underside of the bar.

5. The means of claim 1 wherein the base member includes pivot means comprising at least one curved slot through which extends a bolt means for attachment of the base means to the mounting structure, wherein pivoting of the base member is allowed by sliding of the bolt means within the slot.

6. The means of claim 5 wherein the base member includes two curved slots, each having approximately the same arcuate shape and being oppositely disposed towards one another around a pivot

7. The means of claim 1 wherein the joint member includes a hinge means between the first and second sections, the hinge means comprising first and second surfaces generally in sliding abutment and having a securing means connecting the first and second sections of the joint member, wherein the abutting surfaces are slidable around a second axis.

8. The means of claim 7 wherein the second axis is generally horizontal to allow tilting movement of the lighting fixture in a vertical direction.

9. The means of claim 1 wherein the first axis is generally vertical to allow horizontal adjustability of the lighting fixture.

10. The means of claim 1 wherein the first bracket means includes first and second arms extending outwardly to opposite transverse sides of the second section of the joint member and the lighting fixture.

11. The means of claim 10 wherein the arms of the first bracket means extend in a generally vertical plane.

12. The means of claim 1 wherein the second bracket means comprise first and second flanges which extend from the base member on generally opposite sides of the mounting structure.

13. The means of claim 1 further comprising first actuator means connected between the first and second bracket means, the actuator means comprising a power member having first and second ends connected to the first and second bracket means, respectively, and having an extendable portion to extend the length of the actuator means, which in turn causes pivotal movement between the first and second bracket means.

14. The means of claim 13 wherein the first and second ends of the first actuator means are attachable to various positions on the first and second bracket means, according to which opposite side of the mounting structure the lighting fixture is desired to be adjustably positioned.

15. The means of claim 13 wherein the first actuator means extends generally within a vertical plane.

16. A mounting structure for allowing tiltable and pivotable movement of a lighting fixture on opposite sides of an attachment bar comprising:

a base member which is pivotably securable to the bar around a generally vertical pivot axis and which has opposite ends extending outwardly of the opposite sides of the bar;

a hingeable arm extending from the base member, and having an outer end to which the lighting fixture is securable, the arm being hingeable around a generally horizontal pivot axis;

a first bracket mounted on the light fixture and having at least two attachment means located in a generally vertical plane on opposite sides of the lighting fixture;

a second bracket mounted on the base member having at least two attachment means located generally on opposite sides of the attachment bar;

the first and second brackets being adapted to receive adjustment means between respective attachment means for determining the degree of tilt of the lighting fixture on either one opposite side or the other opposite side of the attachment bar.

* * * * *